I. ANDERSON.
SILO TAMPER.
APPLICATION FILED JAN. 11, 1916.
1,214,872.
Patented Feb. 6, 1917.
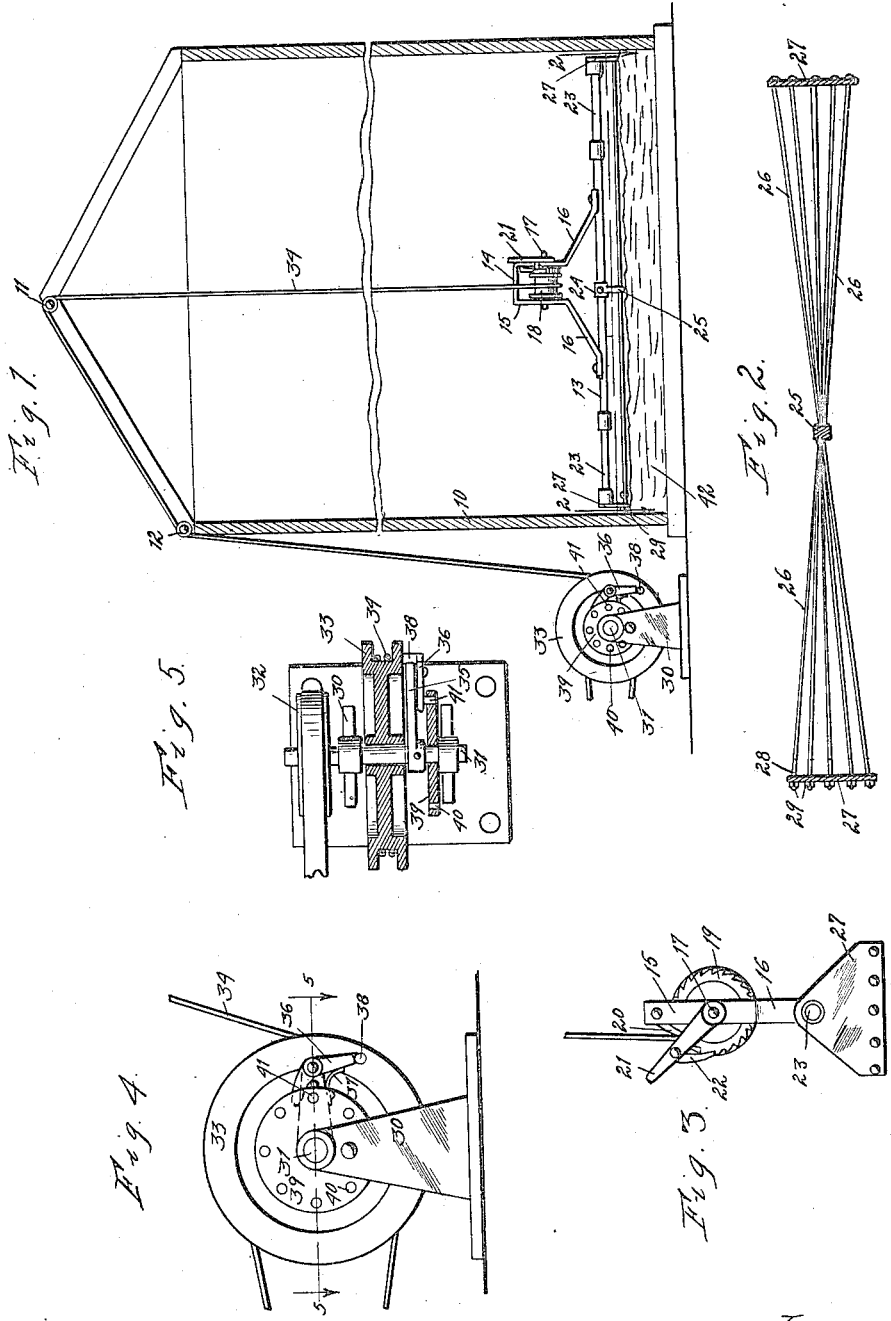
Witnesses.
G. F. Jurechek.
Will Freeman
Inventor
Isaac Anderson.
By Orwig & Bair
Attys.

UNITED STATES PATENT OFFICE.

ISAAC ANDERSON, OF MADRID, IOWA.

SILO-TAMPER.

1,214,872. Specification of Letters Patent. Patented Feb. 6, 1917.

Application filed January 11, 1916. Serial No. 71,463.

*To all whom it may concern:*

Be it known that I, ISAAC ANDERSON, a citizen of the United States, and resident of Madrid, in the county of Boone and State of Iowa, have invented a certain new and useful Silo-Tamper, of which the following is a specification.

The object of my invention is to provide a silo tamper of simple, durable and inexpensive construction.

A further object is to provide in such a device a tamping member of novel construction.

Still a further object is to provide in such a machine suitable mechanism whereby power from a rotating shaft may be used for raising the tamping member, said parts including an automatic releasing device for disconnecting the tamping member with the shaft at suitable intervals.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a vertical, sectional view through a silo equipped with a tamping mechanism embodying my invention.

Fig. 2 shows a horizontal, sectional view through the tamping member, taken on the line 2—2 of Fig. 1.

Fig. 3 shows a side elevation of the drum mounted on the tamping mechanism, with the ratchet and double pawl arrangement thereof.

Fig. 4 shows a side elevation of the winding drum and connected parts, and

Fig. 5 shows a horizontal, sectional view through the mechanism shown in Fig. 4.

In the form of my invention illustrated in the accompanying drawings, I have shown my tamping device installed in connection with a silo indicated in the drawings by the reference character 10, having at the center of the roof a guide pulley 11 and at one side at the top of the silo a guide pulley 12.

The tamping tool of my improved device comprises a central horizontal member 13, preferably tubular in form. Mounted on the member 13 is a supporting bracket having a horizontal portion 14 spaced above the member 13, parallel downwardly extending arms 15 at each end of the member 14, and arms 16 extending from the lower ends of the members 15 downwardly and laterally to the member 13 to which the arms 16 are secured. Mounted between the arms 15 is a shaft 17 on which is a drum 18.

Fixed on the drum 18 at one end thereof, is a ratchet wheel 19. Pivoted to one of the arms 15 above the ratchet wheel 19 is a pawl 20 adapted normally to hang by gravity in contact with the teeth of the wheel 19.

Pivoted on the shaft 17 is a lever 21 to which is pivoted a pawl 22 adapted when the lever is raised to drop into engagement with the teeth of the ratchet wheel 19, and adapted when the lever is allowed to drop by gravity, to remain out of contact with the ratchet wheel.

Detachably mounted at the outer ends of the member 13 are extension members 23 which are of proper length according to the diameter of the silo in which my device is used. Secured to the central portion of the member 13 by means of a collar 24 is a downwardly extending bar 25. Mounted on the bar 25 are a plurality of wires 26 which extend horizontally away from the bar 25 and are spread in fan-shape, as shown in Fig. 2, at their outer ends. On the outer ends of the members 23 are triangular plates 27.

Arranged horizontally in a row near the lower horizontal edge of one plate 27 is a plurality of eye-bolts 28 in the outer ends of which are nuts 29. The wires 26 are secured to one plate 27 and are preferably slidably extended through the bar 25 and secured at their ends opposite the last mentioned plate 27 to the eyes of the eye-bolts 28. It will be seen that the length of the tamping member may be very readily adjusted.

Suitably mounted preferably near the silo 10, is a frame 30, mounted in which is a horizontal shaft 31. On the shaft 31 is a pulley 32 or other gearing device, whereby rotation may be imparted to the shaft 31 from a suitable source of power.

Rotatably mounted on the shaft 31 is a drum 33. A rope or the like 34 is wound on the drum 18, extended over the pulleys 11 and 12, and then wound on the drum 33.

Fixed on the shaft 31 adjacent to one side of the drum 33, is an arm 35, pivoted to the outer end of which is a pawl 36 having substantially the form of a bell crank lever, and normally held in one position by means of a spring 37.

Extending laterally from the drum 33 is a pin 38 arranged to be in the path of one end of the pawl 36 when the latter stands in its normal position. When the shaft 31 is rotated in the direction for winding the rope 34 on the drum 33, the end of the pawl 36 engages the pin 38 and rotates the drum 33 with the shaft 31.

Mounted on the shaft 31 adjacent to the arm 35 to permit rotation of said shaft, and fixed against rotation, is a wheel 39 having a plurality of openings 40 in which is selectively mounted a pin 41 adapted to engage the other arm of the bell crank lever pawl 36 for throwing the pawl 36 out of engagement with the pin 38 when the arm 35 reaches a certain point in its rotation. The parts are so arranged that when they have once been set in proper position and suitable power is applied to the shaft 31, then the rotation of said shaft will bring the pawl 36 to engagement with the pin 38, whereupon the drum 33 will be rotated thereby winding the rope 34 thereon and raising the tamping member. When the tamping member has been raised a short distance the arm 35 has moved to position for causing the pin 41 to engage the inwardly extending arm of the pawl 36 for throwing said pawl out of engagement with the pin 38. Thereupon the tamping member, which is of considerable weight, will drop by gravity, thereby tamping and packing the contents 42 of the silo. As the shaft 31 continues to rotate the arm 35 and pawl 36 will be brought around to position where the pawl 36 again engages the pin 38 and the action of the tamping mechanism is continued.

When more material is placed in the silo, which can be done without removing the tamping member, the lever 21 may be used for winding the rope 34 on the drum 18 so that the machine can be operated throughout the filling of one silo, if desired, without any adjustment of the winding drum.

It will readily be seen that the person standing in the silo may with a pole or the like, swing the tamping member when it is in its raised position, for tamping the contents of the silo over the entire area thereof. The stroke of the tamping member may be regulated by changing the pin 41 to different holes 40. All that is necessary to adjust the tamper to silos of different diameters is to remove the members 23 and substitute members of different lengths and to change the points on the wires 26 where they are secured to the eye-bolts.

It will be seen that this tamper is of very simple and comparatively inexpensive construction, and that it can be operated with comparatively little power and will tamp the contents of the silo evenly and thoroughly.

Some changes may be made in the construction and arrangement of the parts of my improved tamping device, without departing from its essential features and purposes, and it is my intention to cover by this application any such changes which may be included within the reasonable scope of my claims.

I claim as my invention:

1. In a device of the class described, a horizontal bar, a vertical bar extending downwardly therefrom, supporting members operatively connected with the outer ends of said horizontal bar, and wires secured to said supporting members and mounted on said vertical bar.

2. In a device of the class described, a horizontal bar, a vertical bar extending downwardly therefrom, supporting members operatively connected with the outer ends of said horizontal bar, and wires secured to one of said supporting members and slidably extended through said vertical member, said wires being adjustably secured to the other supporting member.

3. In a device of the class described, a horizontal bar, a vertical bar extending downwardly therefrom, supporting members operatively connected with the outer ends of said horizontal bar, and wires secured to said supporting members and mounted on said vertical bar, said wires being spaced from each other in a substantially horizontal plane at their outer ends.

4. In a device of the class described, a horizontal bar, a vertical bar extending downwardly therefrom, supporting members operatively connected with the outer ends of said horizontal bar, and wires secured to one of said supporting members and slidably extended through said vertical member, said wires being adjustably secured to the other supporting member, said wires being spaced from each other substantially in a horizontal plane at their outer ends.

5. In a device of the class described, a horizontal bar, a vertical bar extending downwardly therefrom, supporting members operatively connected with the outer ends of said horizontal bar, wires secured to said supporting members and mounted on said vertical bar, a frame on said horizontal bar, a drum mounted on said frame, and means for locking said drum against rotation in various positions of its movement.

6. In a device of the class described, a horizontal bar, a vertical bar extending downwardly therefrom, supporting members operatively connected with the outer ends of said horizontal bar, wires secured to said supporting members and mounted on said vertical bar, a frame on said horizontal bar, a drum mounted on said frame, a ratchet operatively connected with said drum, a pivoted pawl adapted to coact with said ratchet, a pivotally mounted lever, and a pawl adapted to be moved to position for engaging said ratchet.

7. In a device of the class described, a horizontal member, members mounted at the ends of said horizontal member, supporting members at the outer ends of said second members, a vertical bar extending downwardly from said first member, a plurality of wires secured to one of said supporting members and slidably extended through said vertical bar, and fastening members mounted in the other supporting member, said wires being adjustably secured to said fastening members.

Des Moines, Iowa, November 13, 1915.

ISAAC ANDERSON.

Copies of this patent may be obtained for five cents each, by addressing the "Commissioner of Patents, Washington, D. C."